US011521076B2

(12) United States Patent
Stitt et al.

(10) Patent No.: US 11,521,076 B2
(45) Date of Patent: Dec. 6, 2022

(54) ARCHITECTURE-INDEPENDENT APPROXIMATION DISCOVERY

(71) Applicant: UNIVERSITY OF FLORIDA RESEARCH FOUNDATION, INC., Gainesville, FL (US)

(72) Inventors: Gregory M. Stitt, Gainesville, FL (US); David M. Campbell, Jacksonville, FL (US); Raz Aloni, Gainesville, FL (US); Thomas Vaseliou, Satellite Beach, FL (US); Jayson Salkey, Lauderhill, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 1072 days.

(21) Appl. No.: 16/024,389

(22) Filed: Jun. 29, 2018

(65) Prior Publication Data
US 2019/0005390 A1 Jan. 3, 2019

Related U.S. Application Data

(60) Provisional application No. 62/527,667, filed on Jun. 30, 2017.

(51) Int. Cl.
| | |
|---|---|
| *G06N 3/12* | (2006.01) |
| *G06F 17/18* | (2006.01) |
| *G06N 7/00* | (2006.01) |
| *G06N 20/00* | (2019.01) |
| *G06N 5/00* | (2006.01) |

(52) U.S. Cl.
CPC ............. *G06N 3/126* (2013.01); *G06F 17/18* (2013.01); *G06N 7/005* (2013.01); *G06N 20/00* (2019.01); *G06N 5/003* (2013.01)

(58) Field of Classification Search
CPC ........ G06N 3/126; G06N 20/00; G06N 7/005; G06N 5/003; G06F 17/18
See application file for complete search history.

(56) References Cited

U.S. PATENT DOCUMENTS

2018/0114116 A1* 4/2018 Liang ................... G06N 3/0454

OTHER PUBLICATIONS

Esmaeilzadeh, Hadi, Adrian Sampson, Luis Ceze, and Doug Burger. "Neural acceleration for general-purpose approximate programs." In 2012 45th Annual IEEE/ACM International Symposium on Microarchitecture, pp. 449-460. IEEE, 2012. (Year: 2012).*

(Continued)

*Primary Examiner* — Casey R. Garner
(74) *Attorney, Agent, or Firm* — Alston & Bird LLP

(57) ABSTRACT

Systems and methods for discovering approximations for compilers to apply through genetic programming and deterministic symbolic regression heuristics are provided. A method for discovering approximations for compilers and runtime optimization can include profiling a program to identify performance critical functions, determining appropriate candidates for approximation and developing application and architecture specific approximations through machine learning techniques, genetic programming, and deterministic heuristics. Such approximations can target any optimization goal, with a primary emphasis on parallelism, or can provide a set of Pareto-optimal tradeoffs.

34 Claims, 14 Drawing Sheets

(56) References Cited

OTHER PUBLICATIONS

Sekanina, Lukas. "Introduction to approximate computing: Embedded tutorial." In 2016 IEEE 19th International Symposium on Design and Diagnostics of Electronic Circuits & Systems (DDECS), pp. 1-6. IEEE, Apr. 20, 2016. (Year: 2016).*

McAfee, Lawrence, and Kunle Olukotun. "EMEURO: A framework for generating multi-purpose accelerators via deep learning." In 2015 IEEE/ACM International Symposium on Code Generation and Optimization (CGO), pp. 125-135. IEEE, 2015. (Year: 2015).*

Kotanchek, Mark, Guido Smits, and Ekaterina Vladislavleva. "Trustable symbolic regression models: using ensembles, interval arithmetic and pareto fronts to develop robust and trust-aware models." In Genetic programming theory and practice V, pp. 201-220. Springer, Boston, MA, 2008. (Year: 2008).*

Fortin, Félix-Antoine et al. *DEAP: Evolutionary Algorithms Made Easy*, Journal of Machine Learning Research, vol. 13, Issue 1, pp. 2171-2175, Jul. 2012.

Walsh, Paul et al. *Paragen—A Novel Technique For The Autoparallelisation of Sequential Programs Using GP*, In Proceedings of the $1^{st}$ Annual Conference On Genetic Programming, pp. 406-409, Jul. 18, 1996, MIT Press.

Salhi, Abdellah et al. *Parallel Implementation Of A Genetic-Programming Based Tool For Symbolic Regression*, Information Processing Letters, vol. 66, Issue 6, pp. 299-307, Jun. 1998.

\* cited by examiner

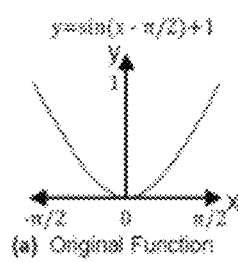
FIG. 5(a)
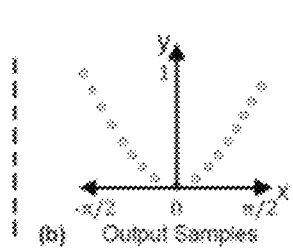
FIG. 5(b)
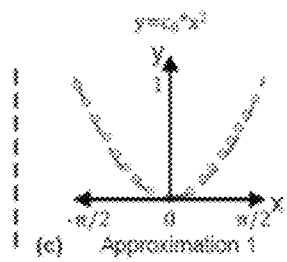
FIG. 5(c)
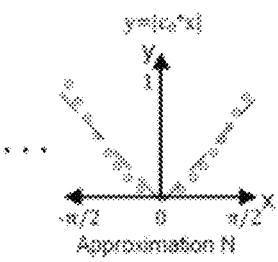

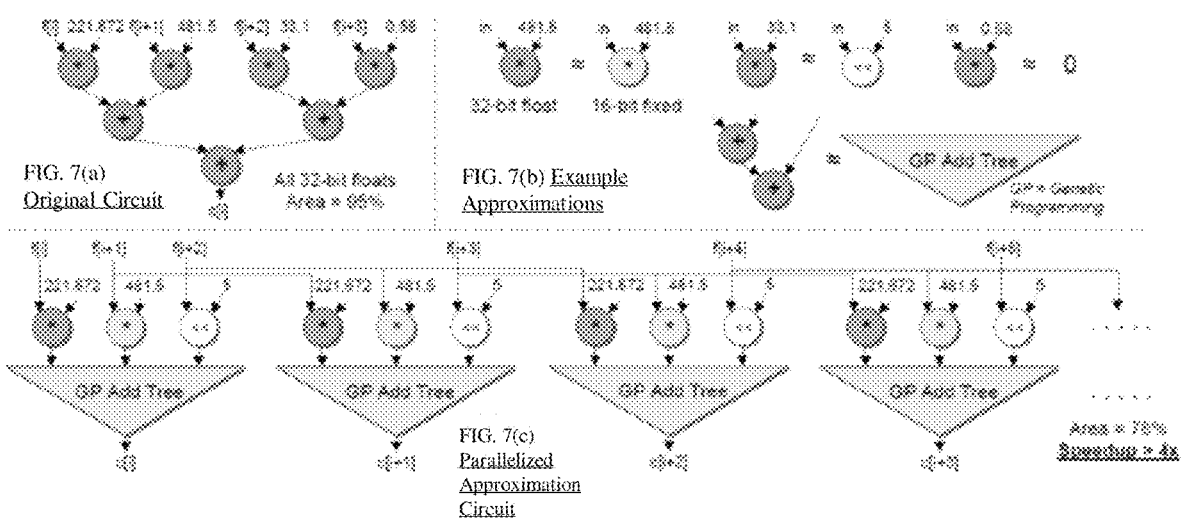

```
float f(float b[]) {
    float x = 0.0;
    for (int i=0; i < 5; i++) {
        x = (x + b[i]) / b[i];
    }
    return x;
}
```
FIG. 8(a)
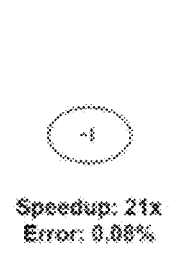
Speedup: 21x
Error: 0.08%
FIG. 8(b)
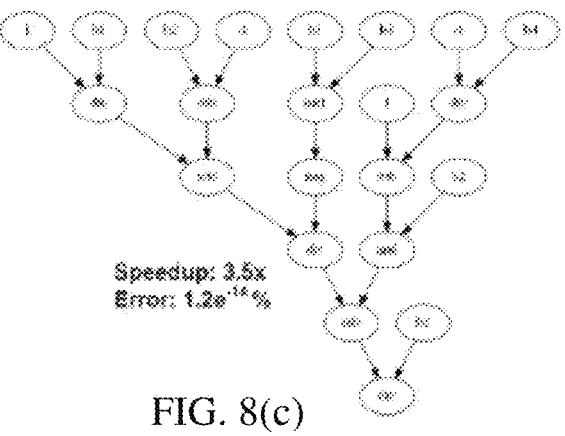
Speedup: 3.5x
Error: 1.2e⁻¹⁴ %
FIG. 8(c)

ARCHITECTURE-INDEPENDENT APPROXIMATION DISCOVERY

CROSS-REFERENCE TO RELATED APPLICATIONS

The present application claims priority to U.S. Provisional Patent Application Ser. No. 62/527,667, titled "ARCHITECTURE-INDEPENDENT APPROXIMATION DISCOVERY," filed Jun. 30, 2017, the contents of which are incorporated herein by reference in their entirety.

STATEMENT OF GOVERNMENT SUPPORT

This invention was made with government support under grant number CNS1149285 awarded by National Science Foundation. The government has certain rights in the invention.

BACKGROUND

The end of Dennard Scaling and the increasing difficulty of satisfying Moore's Law have compelled computer researchers to search for creative new ways to enhance computing capability without relying on additional transistors. Approximate computing is an emerging technology that enables such improvements in performance, scalability, and/or energy.

Approximate computing is a computation technique which returns a possibly inexact result rather than a guaranteed exact result, and can be used for applications where an approximate result is sufficient for its purpose. Approximate computing is based on the idea that the output accuracy of an application often significantly exceeds requirements and can be reduced to improve efficiency. One example of such situation is for a search engine where no exact answer may exist for a certain search query and hence, many answers may be acceptable. Similarly, occasional dropping of some frames in a video application can go undetected due to perceptual limitations of humans. Approximate computing is based on the observation that in many scenarios, performing exact computation requires large amount of resources, whereas allowing bounded approximation can provide disproportionate gains in performance and energy, while still achieving acceptable result accuracy.

Machine learning is an ideal candidate for approximate computing due to many of the results already being approximate and in many cases not having a formal definition of correctness.

Existing approximation methods suffer from significant problems, such as the approximations being too difficult to discover, being too application specific to be supported by existing development tools, providing limited improvement and applicability, and being limited by overly restrictive approximation and acceptability definitions.

The inventors have identified a number of deficiencies and problems associated with existing approximation methods. Through applied effort, ingenuity, and innovation, many of these identified problems have been solved by developing solutions that are included in embodiments of the present disclosure, many examples of which are described in detail herein.

BRIEF SUMMARY

This specification relates to the use of genetic programming and deterministic heuristics for approximation discovery and optimization. Embodiments of the present disclosure provide a framework that complements existing compilers and runtime optimizers to automatically programmatically discover application and system specific approximations to address the aforementioned concerns.

Embodiments of the present disclosure are directed to systems and methods for programmatically discovering approximations for compilers. In other embodiments of the present disclosure, maximization of parallel computing systems is applied to optimization of selected approximations.

Embodiments of the present disclosure comprise discovering approximations for compilers to apply using one or more of machine learning techniques, genetic programming, and deterministic symbolic regression heuristics. Embodiments of the present disclosure use such techniques to identify approximation candidates, develop application and architecture specific approximations, and describe Pareto-optimal tradeoffs between error and performance to help determine applicability of the approximations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF DRAWINGS

Figure 1:
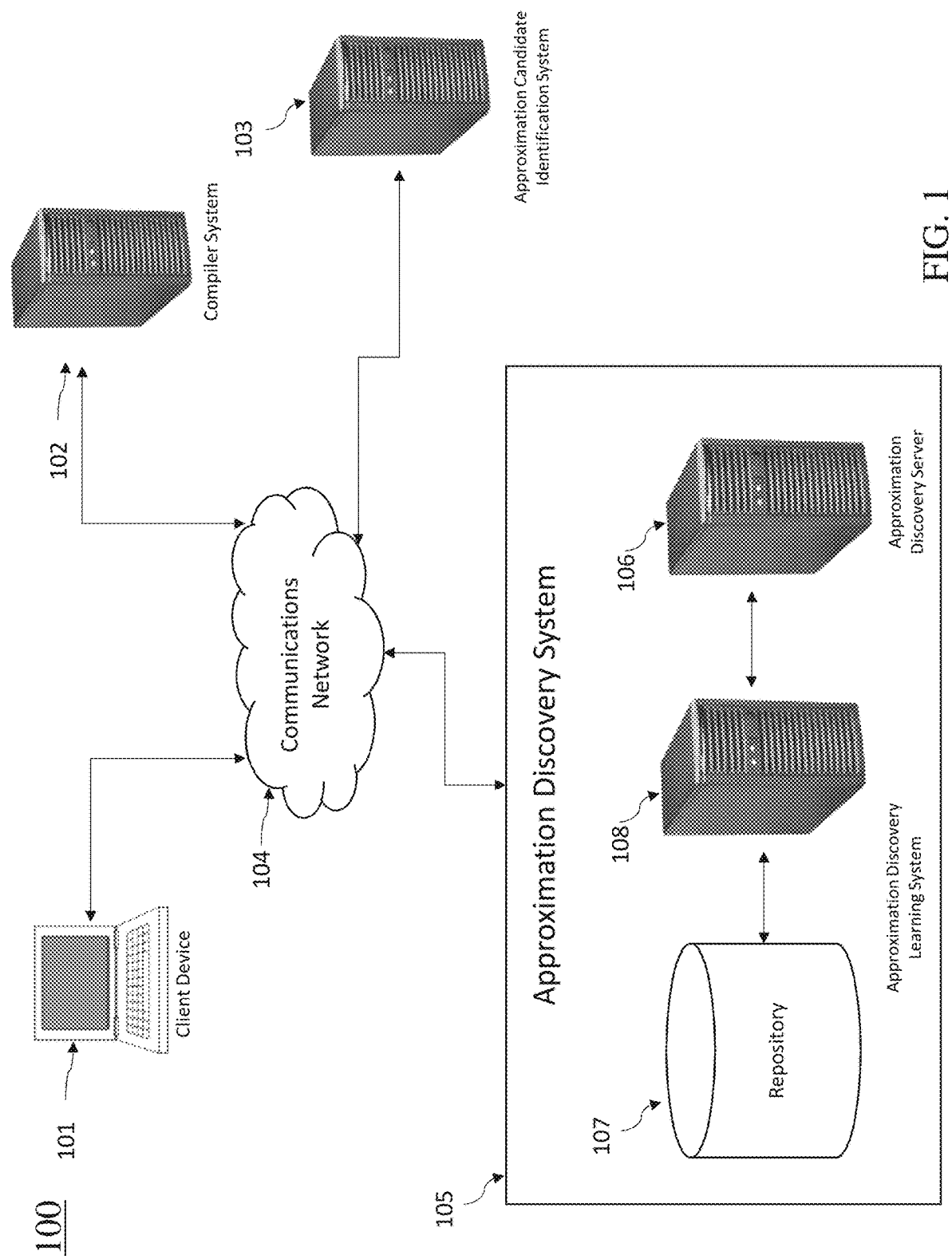
Figure 2:
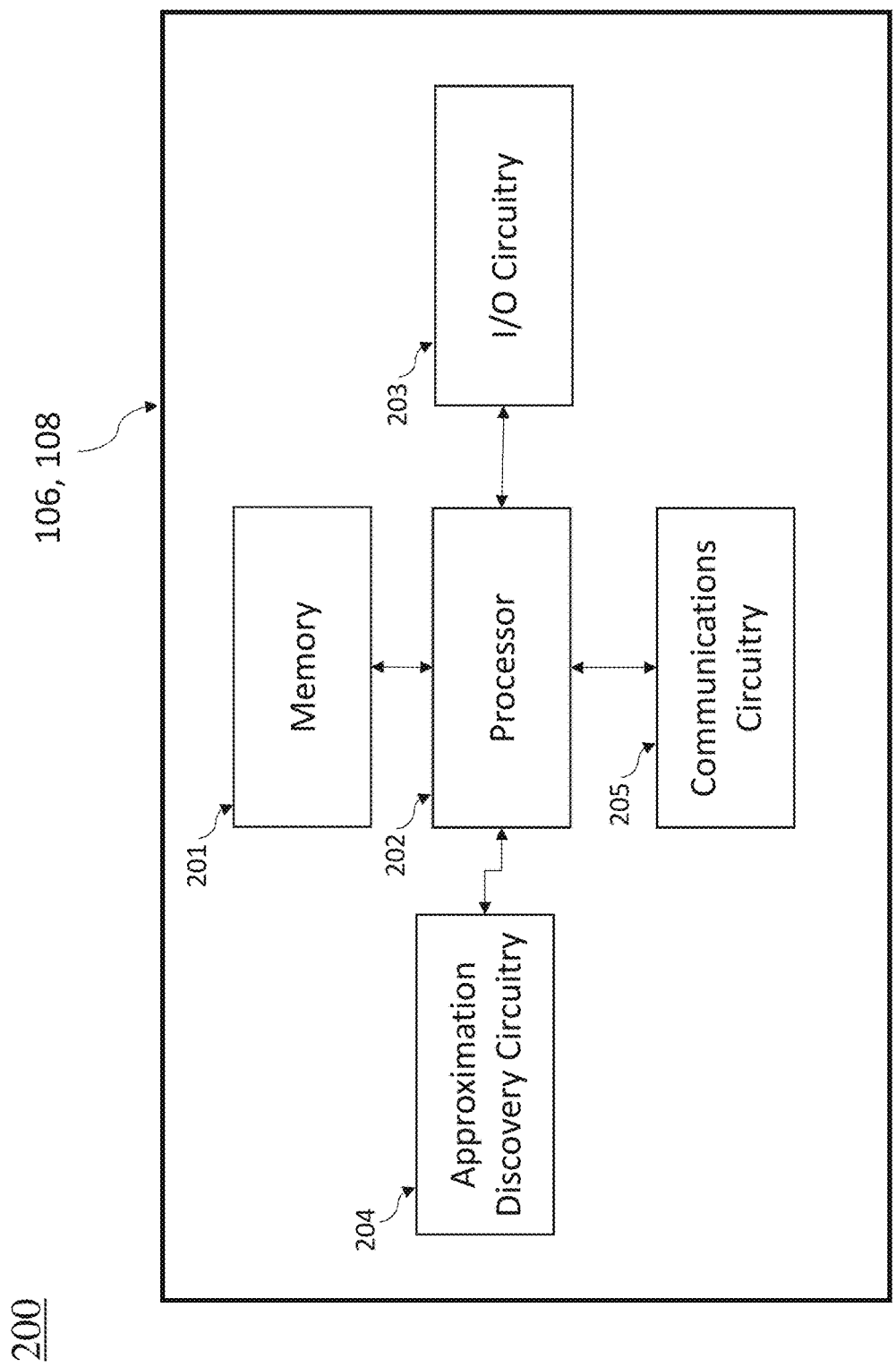
Figure 3:
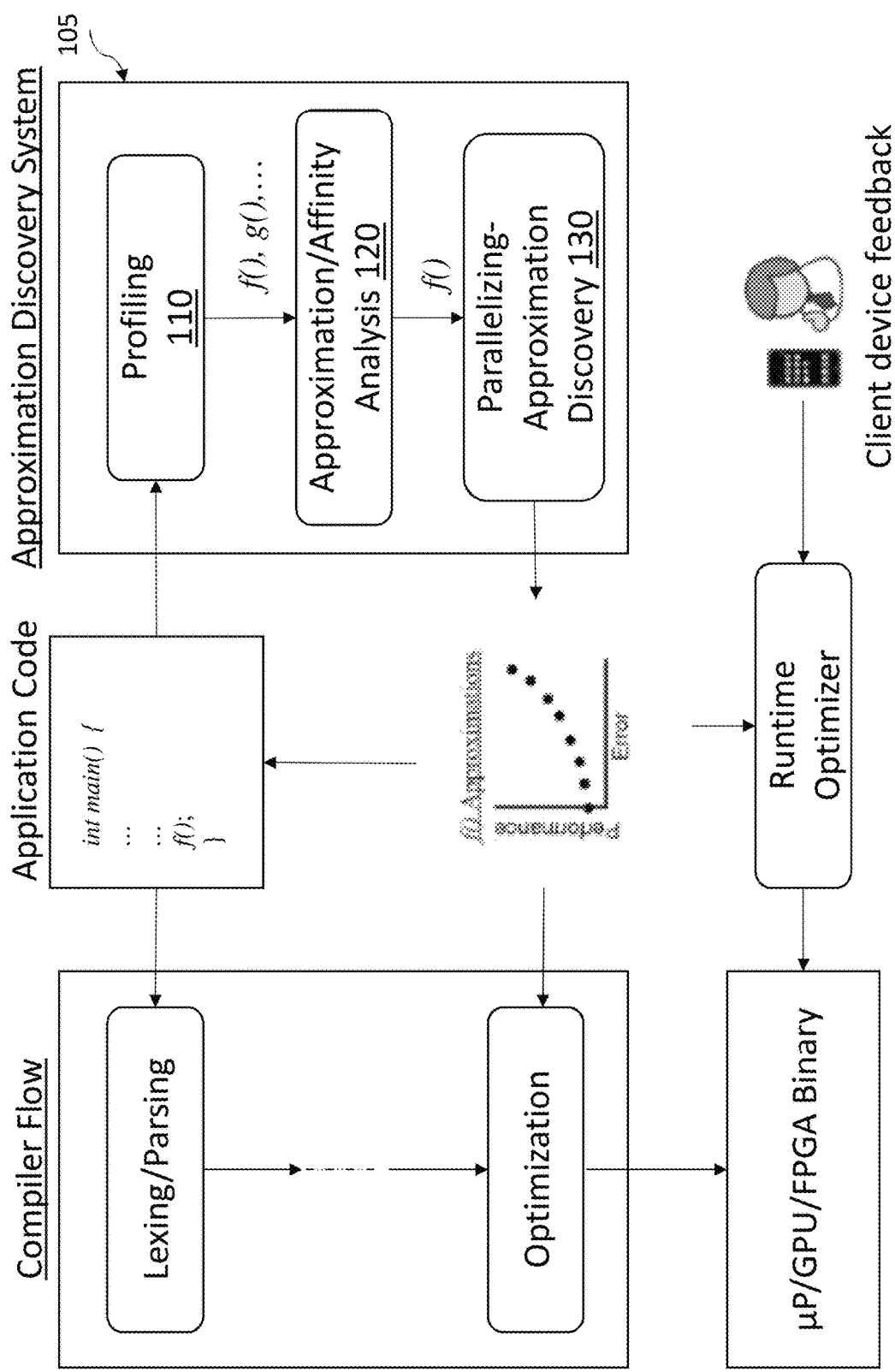
Figure 4A:
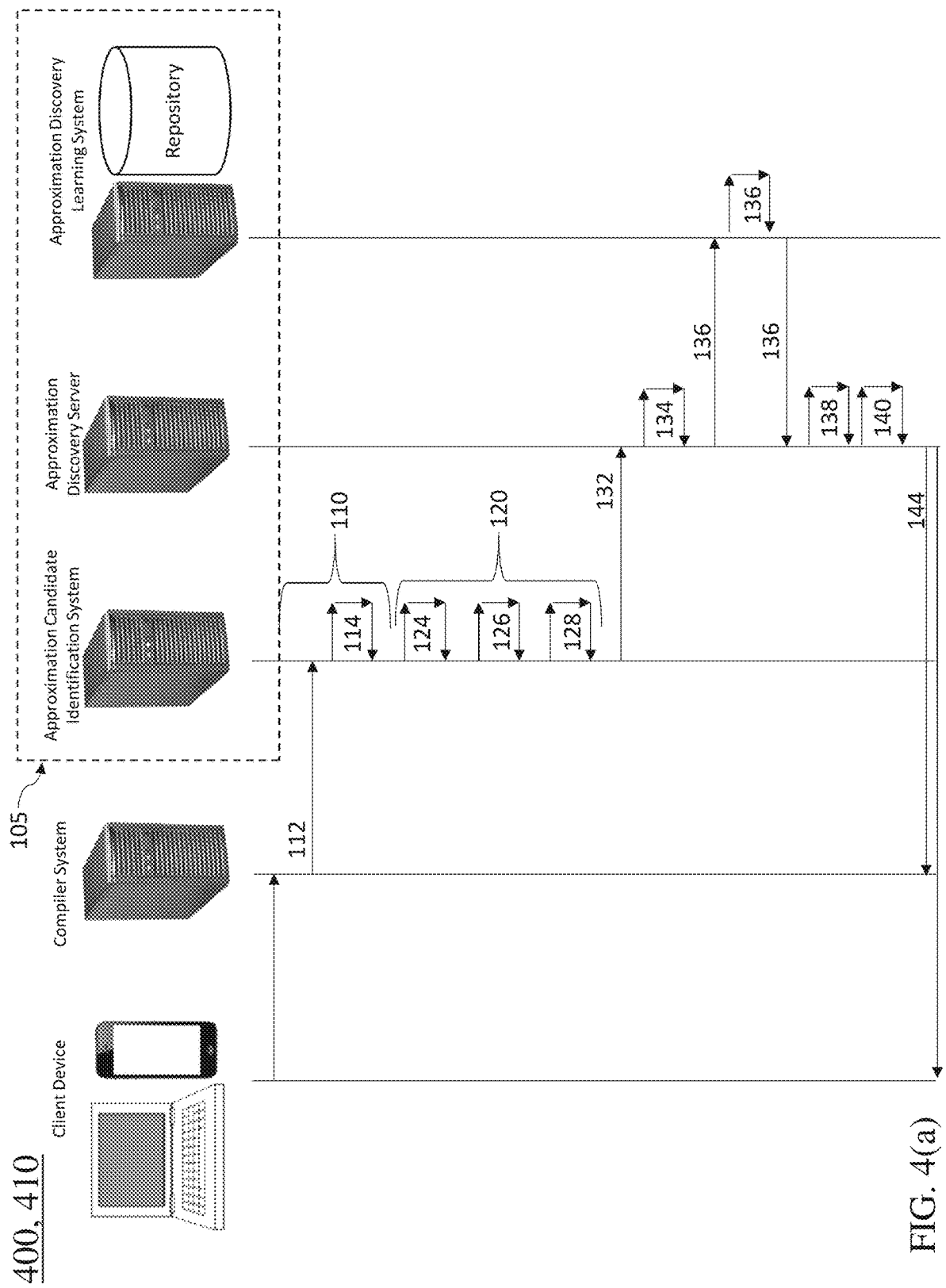
Figure 4B:
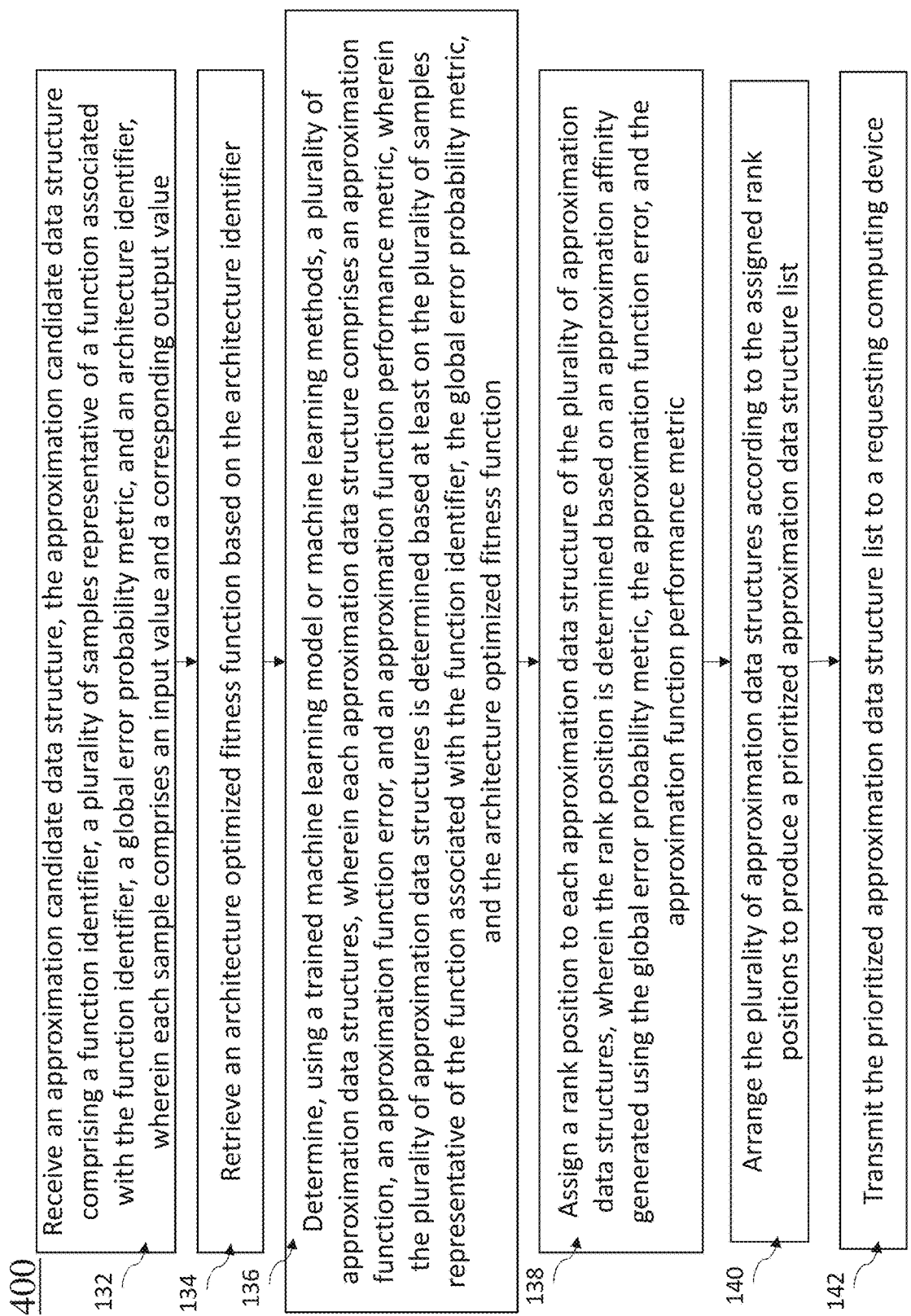
Figure 4C:
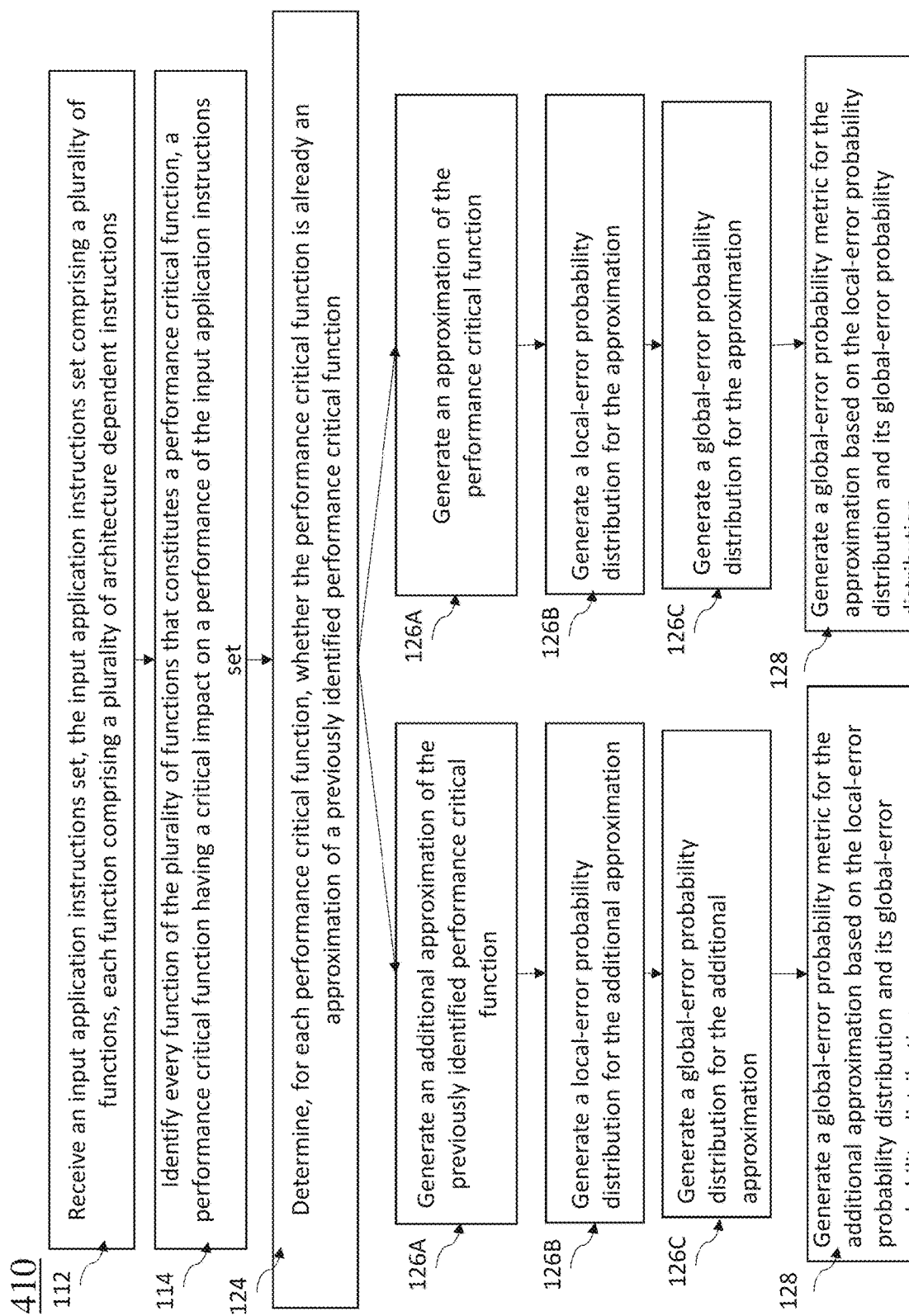
Figures 6A, 6B, 6C:
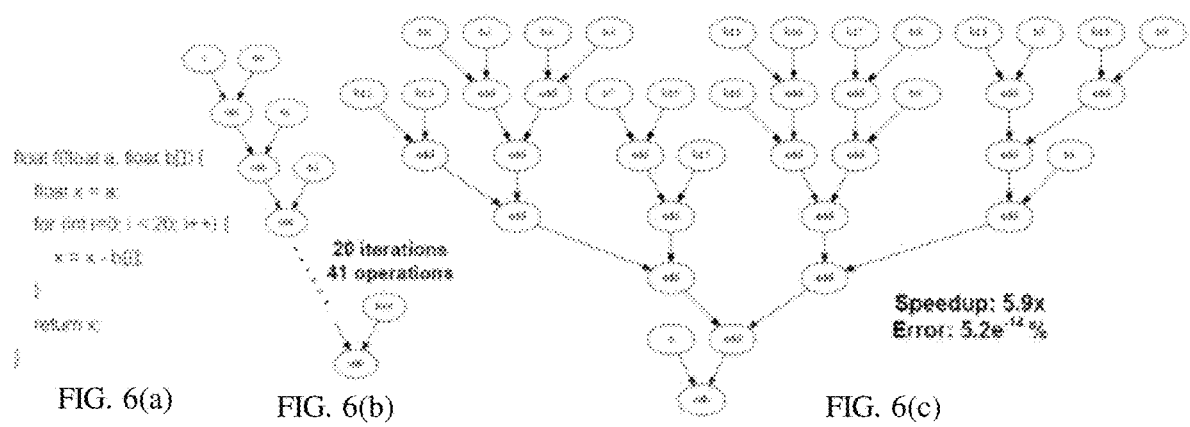
Figure 9:
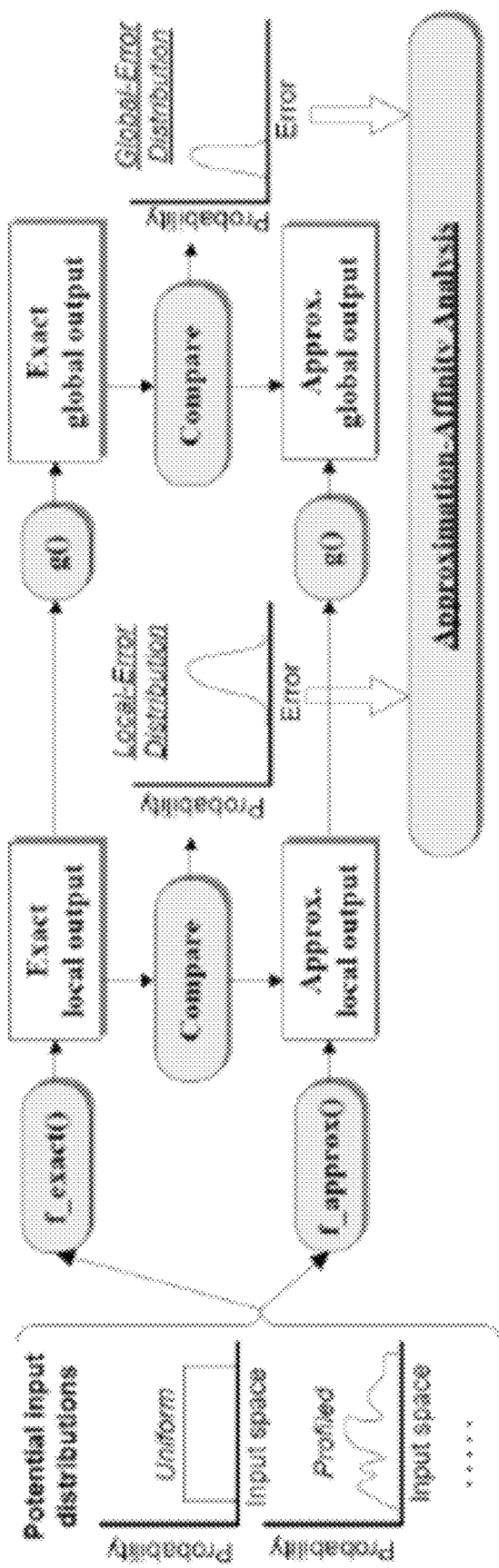
Figure 11:
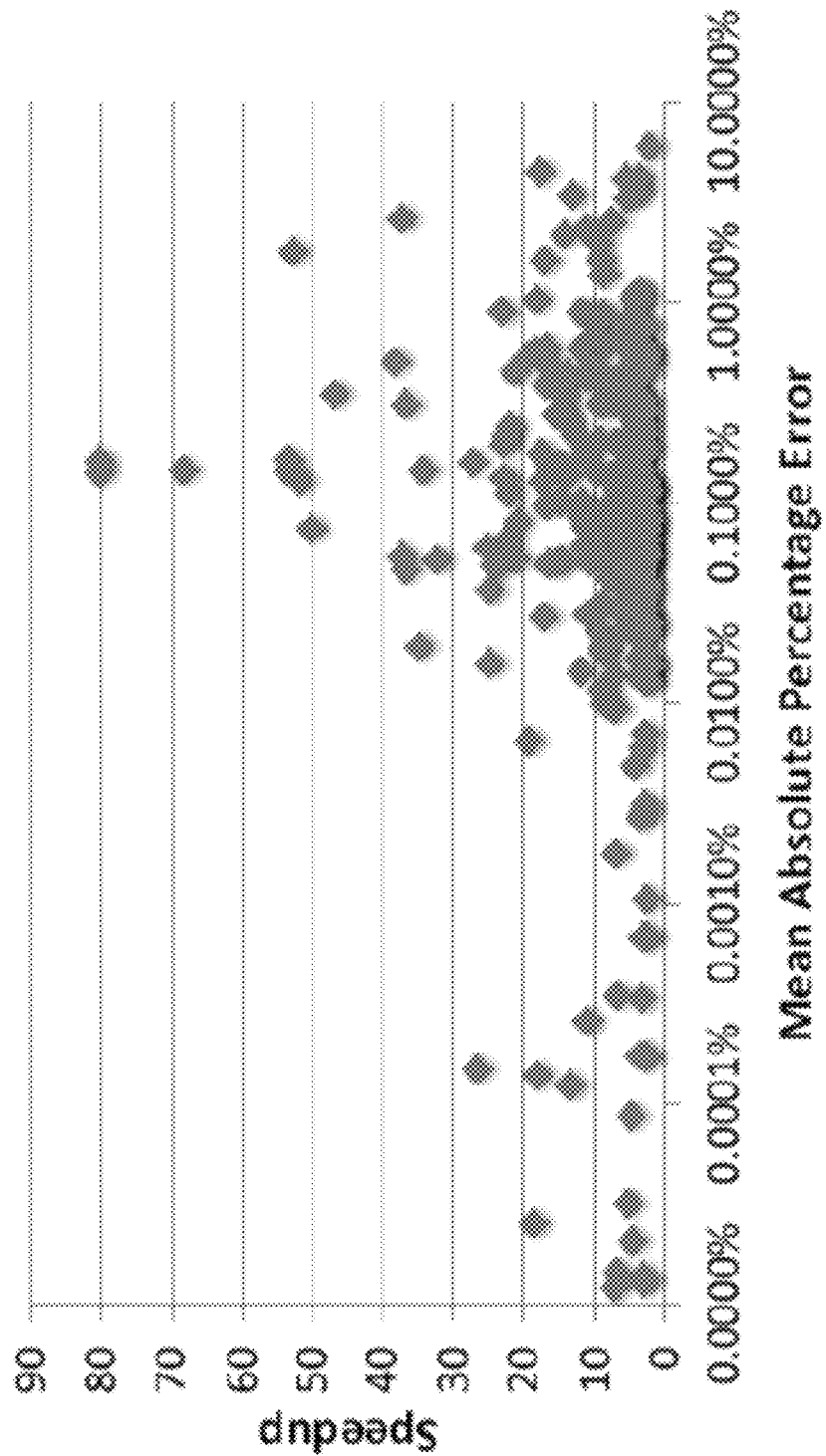
Figure 12:
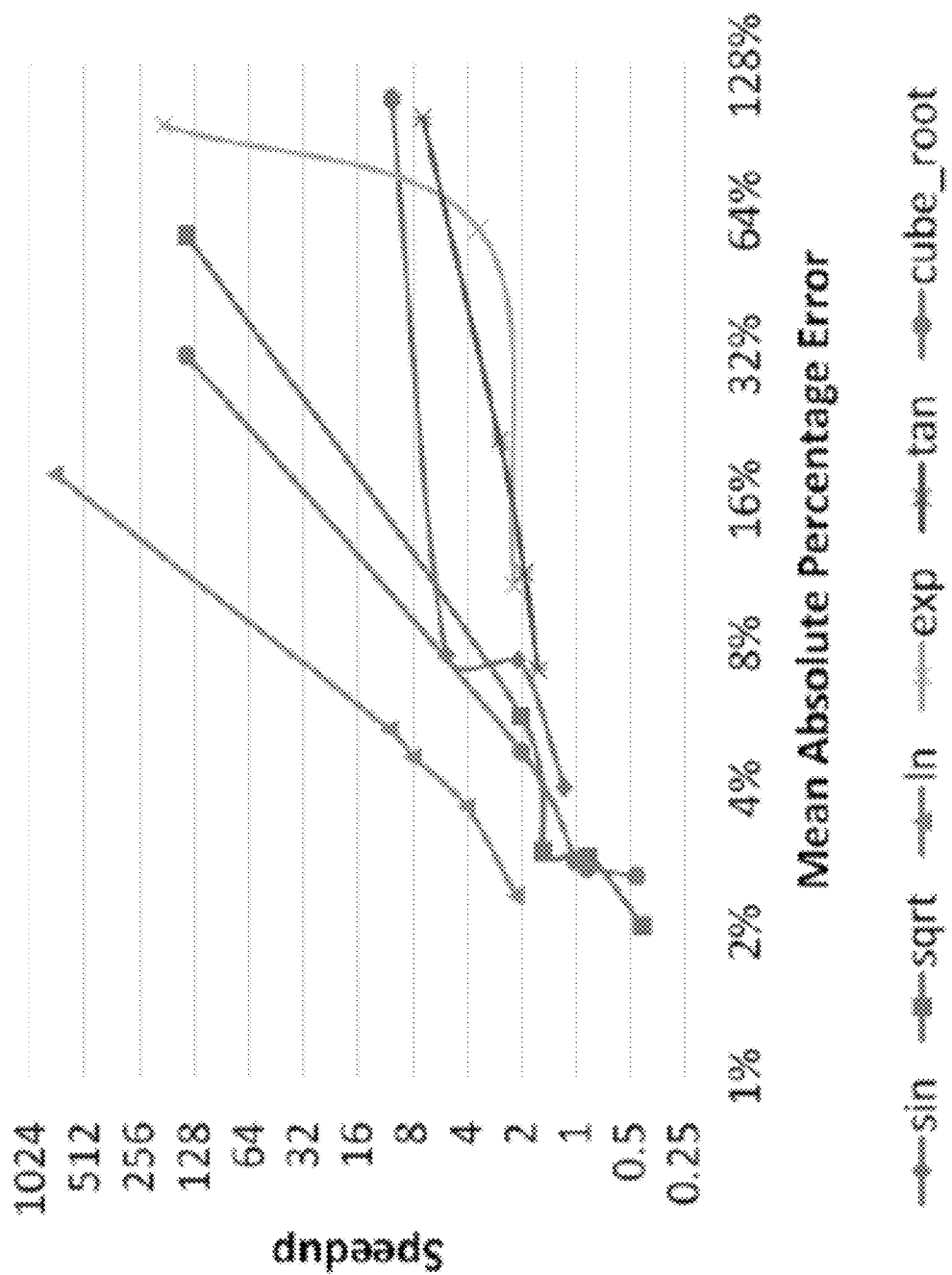

Having thus described the disclosure in general terms, reference will now be made to the accompanying drawings, which are not necessarily drawn to scale, and wherein:

FIG. 1 illustrates an example computing system within which embodiments of the present disclosure may operate;

FIG. 2 is an exemplary schematic diagram of a computing entity according to one embodiment of the present disclosure;

FIG. 3 is an exemplary architecture of an approximation discovery system according to embodiments of the present disclosure;

FIG. 4(a) illustrates an exemplary approximation discovery process according to embodiments of the present disclosure;

FIG. 4(b) illustrates an exemplary approximation discovery process according to embodiments of the present disclosure;

FIG. 4(c) illustrates an exemplary approximation discovery process according to embodiments of the present disclosure;

FIG. 5(a) illustrates a diagram representation of an exemplary parallel-approximation process according to embodiments of the present disclosure;

FIG. 5(b) illustrates a diagram representation of an exemplary parallel-approximation process according to embodiments of the present disclosure;

FIG. 5(c) illustrates a diagram representation of an exemplary parallel-approximation process according to embodiments of the present disclosure;

FIG. 6(a) illustrates an exemplary unrolled data flow graph (DFG);

FIG. 6(b) illustrates an exemplary unrolled data flow graph (DFG);

FIG. 6(c) illustrates an exemplary unrolled data flow graph (DFG);

FIG. 7(a) illustrates an exemplary field-programmable gate array (FPGA) specific approximations for use with embodiments of the present disclosure;

FIG. 7(*b*) illustrates an exemplary field-programmable gate array (FPGA) specific approximations for use with embodiments of the present disclosure;

FIG. 7(*c*) illustrates an exemplary field-programmable gate array (FPGA) specific approximations for use with embodiments of the present disclosure;

FIG. 8(*a*) illustrates an exemplary unrolled dataflow graph (DFG);

FIG. 8(*b*) illustrates an exemplary unrolled dataflow graph (DFG);

FIG. 8(*c*) illustrates an exemplary unrolled dataflow graph (DFG);

FIG. 9 illustrates an exemplary process of applying an approximation infinity analysis to a function for use with embodiments of the present disclosure;

FIG. 10(*a*) illustrates speedup versus root mean squared error for an exemplary approximation analysis according to embodiments of the present disclosure;

FIG. 10(*b*) illustrates speedup versus root mean squared error for an exemplary approximation analysis according to embodiments of the present disclosure;

FIG. 11 illustrates speedup versus mean absolute percentage error for an exemplary approximation analysis according to embodiments of the present disclosure; and FIG. 12 illustrates speedup versus mean absolute percentage error for exemplary parallel approximations using Field Programmable Gate Arrays (FPGAs) according to embodiments of the present disclosure.

DETAILED DESCRIPTION

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the disclosure generally relate the use of genetic programming and deterministic heuristics for approximation discovery and optimization. Embodiments of the present disclosure provide a framework that complements existing compilers and runtime optimizers to automatically programmatically discover application and system specific approximations.

Although existing methods using approximation to promote parallelization exist, these methods are constrained by restricted parallelization and approximation space.

Current approximation computing methods suffer from a limitation introduced because approximations are difficult to discover and can be too application specific to be supported by existing compilers. In many instances, applications are only responsive to certain application specific approximations. Further, even if certain approximations exist, software developers are either not cognizant of their existence or they are not capable of generating application or architecture specific approximations. Existing compilers are also unlikely to dedicate memory to approximations that are only applicable to niche applications.

Current approximation computing methods also suffer from a limitation introduced because, although the approximations do reduce computation, this reduction only provides incremental benefit by improving performance and/or energy consumption by factor of 2×. This modest improvement pales in comparison to the 10× to 1000× performance improvement provided by graphic-processing unit (GPU) and field-programmable gate array (FPGA) accelerations.

Current approximation computing methods are also overly restrictive with respect to approximation and acceptability definitions. Software developers are often unaware or incorrect in regard to which regions of code are suitable candidates for approximation. As a result, current approximation methods are overly restrictive and regions of code that could be approximated go unnoticed or are incorrectly identified as not viable for approximation. An analogous issue is that software developers initially specify the acceptability of a function and resultantly this initial specification constrains all end users of the application. Current approximation methods recognize that less demanding users have higher levels of acceptability than demanding users. The traditional solution to this issue is to either specify a low level of acceptability and sacrifice the efficiency desired from less demanding users or specify a high level of acceptability and sacrifice the quality desired from more demanding users. Additionally, statically defining acceptability prevents a dynamic optimization response that could increase approximation discovery based on real time operating conditions (e.g., low battery life). Furthermore, this static approach to defining acceptability neglects the end user's specific objectives towards a target application.

Contemporary approaches to approximations often require manual specification of approximation candidates, usually via specialized languages or error constraints with standard languages. Determining approximation candidates through manual specification can be overly limiting due to unfamiliarity with the code or poor design choices.

Embodiments of the present disclosure provide novel and advantageous systems that leverage genetic programming, machine learning methods, and deterministic symbolic regression heuristics to discover high-performance application specific approximations. Embodiments of the present disclosure expand the parallelization exploration space and exploit parallelism that maximizes performance or minimizes energy for an error and power constraint.

Advantages of embodiments of the present disclosure include but are not limited to: (1) generating code that is between 2× to 1000× faster than existing compilers can produce; (2) allowing a compiler to universally generate Pareto-optimal approximations without limitation or restriction to a particular computer architecture; (3) allowing a compiler to parallelize code without preserving semantic correctness; and (4) minimizing symbolic regression execution times.

Embodiments of the present disclosure provide a programming framework for compilers to automatically discover new application and architecture specific optimizations and approximations. This framework employs genetic programming, machine learning methods, and deterministic symbolic regression heuristics that explores new algorithms for given functions to discover high-performance application specific approximations that achieve higher performance, lower power consumption, lower resource allocation, or other Pareto-optimal tradeoffs that meets designer specified contracts.

Embodiments of the present disclosure use approximation to increase parallelism and amenability to acceleration. The systems and methods of embodiments of the present disclosure employ genetic programming and deterministic symbolic regression heuristics to generate undiscovered algorithms. In certain embodiments, fitness functions embedded in the genetic programming and other deterministic heuristics maximize parallelism and other optimization related goals (e.g., performance, energy). Additionally, the new and novel approaches described herein improve scalability by avoiding system specific bottlenecks (e.g., data-movement, synchronization), while overcoming specified design constraints (e.g., error, power, and performance).

To maximize optimization, fitness functions used with embodiments can be application and architecture specific and can consider multiple parameters or objectives (e.g., approximation error, parallelism, power, and energy).

Embodiments of the present disclosure provide a complementary approach that uses approximation affinity analysis that treats every function as a potential approximation candidate, while additionally generating Pareto-optimal tradeoffs between performance and error that enables adaptions to an end user's specific preferences.

Embodiments of the present disclosure treat all performance-critical functions as potential approximation candidates and remove subjectivity and informational gaps of designers and/or developers from the process of identification of approximation candidates.

Definitions

The term "approximation" refers to a close match, depending on a developer's or end user's definition of "close" and/or computational requirements including error and performance. For example, a function approximation may be a function that closely matches a target function.

The term "approximation candidate data structure" refers to a data structure representative of a function within application code that has been identified as a candidate for approximation. The approximation candidate data structure may comprises a plurality of records, including for a function identifier. An approximation candidate can be a function that has been identified as a function that can be approximated with acceptable quality.

The term "function" refers to a set of executable instructions that, when executed with a set of inputs, produces a set of outputs according to a definition or intention/configuration of the function. For example, a function can be a logic block (e.g., an adder, a multiplier, a multiplexer, and the like), a loop, a statement, and the like.

The term "function identifier" refers to an identification of an original function within application code.

The term "sample" refers to a set of data, including an input and a corresponding output. The input is provided to any function, and the output is the result of executing the function on the input.

The term "global error probability metric" refers to a computation based on a local-error probability distribution and a global-error probability distribution associated with a particular approximation.

The term "architecture optimized fitness function" refers to a fitness function that is optimized for a particular architecture. Examples of architectures include various CPU architectures, FPGA architectures, and the like.

The term "architecture identifier" refers to a data object representative of a specific architecture.

The terms "machine learning model" or "machine learning method" refer to a computer application that employs an algorithm to build a model from sample inputs. The machine learning model can make predictions or decisions based on input data. The terms "programmatically expected," "infer," "inferred," or "inference" indicate machine prediction of occurrence of certain events. The term "likelihood" refers to a measure of probability for occurrence of a particular event.

The term "symbolic regression" and those related terms refer to algorithms configured for finding an expression that describes a relationship of a set of explanatory variables and a measured variable. An objective is to find a model that minimizes error, and optionally, that also minimizes expression size.

The term "approximation data structure" refers to a data structure comprising records associated with a particular approximation.

The term "approximation function" refers to an approximation of any function, loop, block, statement, etc.

The term "approximation function error" refers to a known error rate for an approximation function.

The term "approximation function performance metric" refers to a known performance impact caused by an approximation function. The performance impact can be positive, negative, or neutral.

The term "rank position" refers to a position within a ranked list.

The term "approximation affinity" refers to a metric representative of how likely an approximation is to be acceptable.

The term "prioritized approximation data structure list" refers to a list of approximation data structures that have been ranked according to assigned rank positions.

The term "parallelism" refers to a level or availability of parallelism provided by a particular architecture. For example, some architectures may have more parallelism than others.

The terms "genetic algorithm" and "genetic programming" refer to evolving a population of candidate solutions to an optimization problem toward better solutions. For example, each candidate solution has a set of properties (e.g., global error probability metric) that can evolve. The evolution usually starts from a population of randomly generated candidates, and is an iterative process, with the population in each iteration called a generation. In each generation, the fitness of every individual in the population is evaluated; the fitness is usually the value of the objective function in the optimization problem being solved. The more fit individuals are stochastically selected from the current population, and each individual's genome is modified (recombined and possibly randomly mutated) to form a new generation. The new generation of candidate solutions is then used in the next iteration of the algorithm. Commonly, the algorithm terminates when either a maximum number of generations has been produced, or a satisfactory fitness level has been reached for the population.

The term "fitness function" refers to is a particular type of objective function that is used to summarize, as a single figure of merit, how close a given design solution is to achieving the set aims. Fitness functions are used in genetic programming and genetic algorithms to guide simulations towards optimal design solutions.

The term "input application instructions set" refers to a set of architecture specific instructions that are grouped into an application program or application code.

The term "performance critical function" refers to a function that is identified as having a statistically significant impact on the performance of an application program. For example, a particular function may be responsible for a significant slow-down in performance, in which case the function may be deemed performance critical.

The term "critical impact" refers to a level of statistical significance of an impact on performance.

The term "local-error probability distribution" refers to a level of error introduced into a function by approximating it.

The term "global-error probability distribution" refers to a level of error introduced into an application program by substituting in a particular approximation for a function.

The term "global error probability threshold" refers to a level of acceptable global error that can be introduced by an approximation function in order for its associated performance critical function can be considered as a candidate for approximation.

The term "error-performance metric acceptability threshold" refers to a threshold of acceptability for a metric representing the tradeoff between error introduced by an approximation into an application program and the performance enhancement afforded the application program by introduction of the approximation.

Example System Architecture

Methods, apparatuses, and computer program products of the present disclosure may be embodied by any of a variety of devices. For example, the method, apparatus, and computer program product of an example embodiment may be embodied by a networked device (e.g., an approximation discovery system), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access an approximation discovery system 105 via a communications network 104 using client devices 101. The approximation discovery system 105 may comprise an approximation discovery server 106 in communication with an approximation discovery learning server 108 and at least one approximation discovery repository 107.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the enterprise group-based communication system. In some embodiments, the protocol is a custom protocol of JSON objects sent via a Websocket channel. In some embodiments, the protocol is JSON over RPC, JSON over REST/HTTP, and the like.

The approximation discovery server 106 may be embodied as a computer or computers as known in the art. The approximation discovery server 106 may provide for receiving of electronic data from various sources, including but not necessarily limited to the client device 101, the compiler system 102, and the approximation candidate identification system 103. For example, the approximation discovery server 106 may be operable to receive application code from a compiler system 102, to receive approximation candidates from an approximation candidate identification system 103 and to transmit approximation candidates to an approximation learning discovery system 108. Compiler system 102 may be operable to receive application code and other input from a client device 101.

The approximation discovery repository 107 may be embodied as a data storage device such as a Network Attached Storage (NAS) device or devices, or as a separate database server or servers. The approximation discovery repository 107 includes information accessed and stored by the approximation discovery learning server 108 to facilitate the operations of the approximation discovery system 105. For example, the approximation discovery repository 107 may include, without limitation, a plurality of functions and their corresponding approximations, and a plurality of input/output pairs for each function and each of its corresponding approximations, and/or the like.

The client device 101 may be any computing device as defined above. Electronic data received by the approximation discovery server 106 from the client device 101 may be provided in various forms and via various methods. For example, the client device 101 may include desktop computers, laptop computers, smartphones, netbooks, tablet computers, wearables, and the like.

Example Apparatus for Implementing Embodiments of the Present Disclosure

The approximation discovery server 106 and approximation discovery learning system 108 may be embodied by one or more computing systems, such as apparatus 200 shown in FIG. 2. The apparatus 200 may include a processor 202, a memory 201, input/output circuitry 203, communications circuitry 205, and approximation discovery circuitry 204. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The approximation discovery circuitry 204 includes hardware configured to support an approximation discovery system. The approximation discovery circuitry 204 may utilize processing circuitry, such as the processor 202, to perform these actions. The approximation discovery circuitry 204 may send to and/or receive data from other entities. It should also be appreciated that, in some embodiments, the approximation discovery circuitry 204 may include a separate processor, specially configured field programmable gate array (FPGA), or application specific interface circuit (ASIC).

Processes Depicting Exemplary System Operation

FIG. 3 illustrates an exemplary approximation discovery system according to embodiments of the present disclosure. Rather than replacing existing compilers, or requiring a specific compiler, embodiments of the subject disclosure complement existing compilers by automatically creating new Pareto-optimal approximations. In embodiments, a system 300 comprises a standard compiler flow in concert with an approximation discovery system 105 and a runtime optimizer. The approximation discovery system 105 is further configured for performing profiling or receiving information representative of profiling 110 application code to identify performance critical functions. In embodiments, the approximation discovery system 105 further configured for performing or receiving information representative of approximation affinity analyses on the identified performance critical functions 120. In embodiments, the approximation discovery system 105 is further configured for performing approximation discovery 130 as described herein. In certain embodiments, the approximation discovery system 105 is further configured for providing the new Pareto-optimal approximations (e.g., from step 130) are provided to a compiler flow to complement standard optimizations. In other embodiments, the approximation discovery system supports continuously conducting online a background search for Pareto-optimal approximations during application development, and continuously providing approximations to a compiler as optimizations are discovered. In another embodiment of the present disclosure, a runtime optimizer is provided with a library of approximations for a given function in order to enable dynamic adaptation to varying conditions (e.g., battery life).

FIGS. 4(a)-4(c) illustrate an exemplary approximation discovery process according to embodiments of the present disclosure. Current compiler technology implements computation-reducing approximations through a process of replacing sections of a dataflow graph with known approximations. This approach is limited by its over-reliance on extracting known approximations. In many instances, approximations are not known or readily available for substitution. To address this reliance on previously known approximations, certain embodiments of the present disclosure identify approximations using a combination of machine learning genetic (automatic) programming, and deterministic symbolic regression heuristics.

In FIGS. 4(a) and 4(b), a method 400 for discovering and optimizing approximations comprises receiving an approximation candidate data structure 132. In embodiments, the approximation candidate data structure comprises a function identifier, a plurality of samples representative of a function associated with the function identifier, a global error probability metric, and an architecture identifier. In embodiments, each sample comprises an input value for each parameter of the function being approximated and a corresponding output value.

In embodiments, the method 400 continues with retrieving an architecture optimized fitness function based on the architecture identifier 134. In embodiments, the architecture optimized fitness function is retrieved from local or remote data storage. In other embodiments, the architecture optimized fitness function is received from a client device.

In embodiments, the method 400 continues with determining, using a trained machine learning model or machine learning methods, a plurality of approximation data structures 136. In embodiments, each approximation data structure comprises an approximation function, an approximation function error, and an approximation function performance metric. In embodiments, the plurality of approximation data structures is determined based at least on the plurality of samples representative of the function associated with the function identifier, the global error probability metric, and the architecture optimized fitness function.

In embodiments, the method 400 continues with assigning a rank position to each approximation data structure of the plurality of approximation data structures 138. In embodiments, the rank position is determined based on an approximation affinity generated using the global error probability metric, the approximation function error, and the approximation function performance metric.

In embodiments, the method 400 continues with arranging the plurality of approximation data structures according to the assigned rank positions to produce a prioritized approximation data structure list 140.

In embodiments, the method 400 continues with transmitting the prioritized approximation data structure list to a requesting computing device 142. In embodiments, the requesting computing device comprises a compiler. In embodiments, the requesting computing device comprises a client device, the display of which renders a representation of the prioritized approximation data structure list for selection by a user input mechanism of the client device.

By generating a prioritized output of Pareto-optimal approximations, an end user having a client device, compiler, or runtime optimizer can negotiate through functionally equivalent approximations for specialized applications that have a higher error tolerance and more conservative approximations for error sensitive scenarios. According to embodiments of the present disclosure, approximation affinity analysis allows an end user having a client device to contribute specific parameters to limit the approximation results to correspond to specific application or architecture requirements.

In embodiments, the architecture optimized fitness function comprises a consideration of one or more of approximation error, parallelism, power, and energy. In embodiments, the parallelism, power, and energy are specific to an architecture associated with the architecture optimized fitness function.

In embodiments, the trained machine learning model is a genetic programming algorithm and/or deterministic symbolic regression heuristic. In embodiments, the method further comprises composing a plurality of computational units into a pipelined tree structure. In embodiments, the trained machine learning model is trained using data samples from known inputs and corresponding outputs of mathematical and programmatic functions.

In FIGS. 4A and 4C, the plurality of samples representative of a function associated with the function identifier and a global error probability metric are generated using a method 410. In embodiments, method 410 comprises receiving an input application instructions set 112. In embodiments, the input application instructions set comprises a plurality of functions and each function comprises a plurality of architecture dependent instructions.

In embodiments, method 410 further comprises identifying every function of the plurality of functions that constitutes a performance critical function 114. In embodiments, a performance critical function has a critical impact on a performance of the input application instructions set.

In embodiments, the method 410 comprises determining 124, for each performance critical function, whether the performance critical function is already an approximation of a previously identified performance critical function. For example, functions using real numbers, either floating or fixed points, are already approximated due to the impossibility of representing infinite fractional precision. Functions that are already approximations exhibit a high approximation affinity. Additionally, functions can be specified by a designer as exhibiting high approximation affinity. A high approximation affinity suggests amenability to propagation of additional approximations.

Upon determining that the performance critical function is already an approximation of a previously identified performance critical function, method 410 comprises generating an additional approximation of the previously identified performance critical function 126A.

In embodiments, method 410 comprises generating a local-error probability distribution for the additional approximation 126B by passing a first range of inputs through the previously identified performance critical function to produce a first output, passing the first range of inputs through the additional approximation to produce a second output, and generating a local-error probability distribution for the additional approximation based on the first output and the second output.

In embodiments, method 410 further comprises generating a global-error probability distribution for the additional approximation 126C by passing the first range of inputs through the input application instructions set to produce a third output, passing the first range of inputs through a second input application instructions set comprising the first input application instructions set with the additional approximation substituted in for the performance critical function to produce a fourth output, and generating a global-error probability distribution for the additional approximation based on the third output and the fourth output.

In embodiments, method 410 comprises generating a global-error probability metric for the additional approximation based on the local-error probability distribution and its global-error probability distribution 128.

Upon determining that the performance critical function is not already an approximation of a previously identified performance critical function, method 410 comprises generating an approximation of the performance critical function 126A.

In embodiments, method 410 comprises generating a local-error probability distribution for the approximation 126B by passing a first range of inputs through the performance critical function to produce a first output, passing the first range of inputs through the approximation to produce a second output, and generating a local-error probability distribution for the approximation based on the first output and the second output.

In embodiments, method 410 further comprises generating a global-error probability distribution for the approximation 126C by passing the first range of inputs through the input application instructions set to produce a third output, passing the first range of inputs through a second input application instructions set comprising the first input application instructions set with the approximation substituted in for the performance critical function to produce a fourth output, and generating a global-error probability distribution for the approximation based on the third output and the fourth output.

In embodiments, method 410 comprises generating a global-error probability metric for the approximation based on the local-error probability distribution and its global-error probability distribution 128.

In embodiments, the global error probability of the approximation candidate data structure exceeds a global error probability threshold. In embodiments, if the global error probability of the approximation candidate data structure is less than a global error probability threshold, the approximation candidate data structure is discarded.

In embodiments, the method further comprises generating a plurality of error metrics for the approximation or additional approximation. In embodiments, the method further comprises computing a plurality of error metrics (e.g., root mean squared, mean) by executing the approximation with random inputs and comparing to the original code. In embodiments, the plurality of error metrics comprises one or more of root mean squared and mean. In embodiments, the plurality of error metrics is computing by executing the approximation or additional approximation with randomly selected sets of inputs and comparing the output to that of the input application instructions set executed using the same randomly selected sets of inputs.

In embodiments, determining the plurality of approximation data structures comprises identifying, based on the plurality of samples, mathematical functions equivalent to the function within an error-performance metric acceptability threshold.

In embodiments, the ranges of inputs can be selected from a representative range of expected usage data points, a uniform distribution, or a specific distribution from a library function with knowledge of common usage.

In embodiments, variance levels in the local and global error distributions indicate the range of global error that an end user having a client device can employ to determine the acceptability of the approximation.

FIG. 9 also illustrates an exemplary process of applying an approximation infinity analysis to a function for use with embodiments of the present disclosure. The example illustrated in FIG. 9 includes a program with two functions, f( ) and g( ), where f( ) is considered for approximation.

FIGS. 5(*a*)-5(*c*) illustrate a diagram representations of an exemplary parallel-approximation process according to embodiments of the present disclosure. FIG. 5(*a*) presents a simple sine wave restricted to a range of $-\pi/2$ to $\pi/2$. FIG. 5(*b*) illustrates creation of an arbitrary number of approximations by replacing the original function with samples of outputs for given input arguments. Afterwards, approximation discovery temporarily discards the original function and either searches for existing approximations or develops new approximations based upon the sampled outputs of the original function. By focusing on the sampled outputs, approximation discovery converts the problem into a machine learning problem by discovering an underlying function from a training set. The advantage of this technique is that there are potentially an infinite number possible approximations that correlate to set of sampled data points and many of these approximations may be applicable to parallelization or other optimization goals, while still within acceptable error range. Although this example relates to a simple sine wave, this is for demonstrative purposes only, and embodiments of the present disclosure are capable of operating on more complex mathematical functions and operators.

FIG. 5(*c*) presents images of two possible regressions of the original sine wave function, a parabola and a piecewise linear regression that are both within the original range of $-\pi/2$ to $\pi/2$. Although the regressions in the FIG. 5(*c*) are limited to the original range, an end user can approximate a larger range via decomposition, according to embodiments of the present disclosure. Furthermore, in many instances an end user having a client device may choose to restrict an output range further to be compatible with a target application or specific architecture. The smaller ranges can also result in cheaper approximations than the original function. Even further, the dynamic capabilities of embodiments of the present disclosure, allow an end user having a client device to propagate a spectrum of Pareto-optimal approximations in which one extreme is characterized by low error and low performance and the other extreme is characterized by high performance and high error.

Detection of an unidentified mathematical function or model from the training sets is equivalent to the process of symbolic regression analysis, which relies upon genetic programming and other heuristics to generate new functions and models through recombination of previously existing mathematical expressions. Traditional genetic programming is generally focused on discovering mathematical functions that minimize error in the samples. Approximation discovery not only seeks to minimize error, but is also concerned with finding functions (i.e., approximations) that maximize performance or minimize communication parameters specific to a particular architecture. Furthermore, existing symbolic regression analysis techniques are hampered when attempting to identify particular complex functions. However, the approximation discovery method of embodiments of the present disclosure is not limited in the fashion as it specifically looks for an approximation as opposed to an exact function and additionally has data generated from the original function to assist in discovery.

In order to reduce approximation discovery times, embodiments of the present disclosure can include integrated circuitry that is configurable by a developer or user having a client device to perform application specific tasks (for example, a Field Programmable Gate Array (FPGA) accelerator). In certain embodiments of the present disclosure, the FPGA accelerator can operate as a number of flexible computational units that each provide all the primitives being considered for use in a symbolic regression. The FPGA can change a primitive within each computational unit during each cycle by using integrated circuitry configured to select a signal(s) from one or more input lines and pass the selected signal(s) into a single output line (for example, a multiplexor) in order to select between all the primitives, according to an embodiment of the present disclosure. By composing numerous computational units into a pipelined tree structure, the FPGA accelerator can evaluate any potential program up to the size of that tree, according to some embodiments of the present disclosure.

In some embodiments of the present disclosure, in order to evaluate a potential symbolic regression solution, the FPGA accelerator can configure each computational unit according to a tree structure of the specified solution, and then stream in the inputs to test the accuracy of the solution. Because the FPGA can reconfigure the accelerator within one cycle to evaluate a new potential solution, a lower bound on throughput is the number of cycles required to stream the test inputs through the tree pipeline. In certain embodiments of the present disclosure, at least one test input can be tested every cycle by reading from on-chip block RAM. For 100 test inputs and an FPGA running at 200 MHz, the resulting throughput is 2 million solutions per second, which is approximately three orders a magnitude faster than existing software algorithms for symbolic regression. In another embodiment of the present disclosure, an FPGA can be configured to replicate the tree structure in order to evaluate more than one input at a time. Symbolic regression is not bandwidth limited as the test inputs can be stored in on-chip memory (for example, block RAM) to provide sufficient bandwidth for multiple replications of the tree.

In addition, since a given tree structure contains many possible solutions (i.e. all subtrees of the largest tree are potential solutions), in certain embodiments of the present disclosure, the FPGA can evaluate all those solutions simultaneously, making actual throughput at least one additional order of magnitude faster.

Existing approaches for determining constants during symbolic regression can similarly be integrated into this tree structure using known pipelined implementations of linear and non-linear regression algorithms. Alternatively, in certain embodiments of the present disclosure, the FPGA functionality can be partitioned into a circuit that determines the best form of each potential solution ignoring constants and a separate circuit that determines the optimal constants that minimize the error of those solutions. Alternatively, the same functionality can be partitioned between the FPGA and software running on a processor.

By improving symbolic regression performance by several orders of magnitude, this FPGA accelerator potentially enables new symbolic regression algorithms that are not feasible in existing software.

To generate multiple Pareto-optimal tradeoffs between error and performance, genetic programming, combined with deterministic symbolic regression heuristics, uses different error and performance constraints while executing multiple passes across all approximation candidates. Embodiments of the present disclosure also execute a single pass approach in order to establish preliminary results.

In order to discover approximations of the original function, embodiments of the present disclosure use genetic programming techniques combined with deterministic heuristics to develop solutions from operators, functions, constants, and existing approximations while focusing on the objectives of maximizing performance through parallelism and reduced computation, while minimizing error and meeting other end user goals. Furthermore, a fitness function utilized in genetic programming can be modulated to include characteristics of the target architecture without input from an end user having a client device. This key advantage enables the approximation discovery analysis to operate on any architecture and distinguishes embodiments of the present disclosure from existing techniques.

Embodiments of the present disclosure identify appropriate granularity levels to maximize approximation discovery. Genetic programming is used to readily find solutions at lower granularities; however these solutions are less likely to result in increased parallelism due to reduced computation. Genetic programing techniques can develop more parallelism at higher granularities, but at a cost of increased execution times. When genetic programming is unable to find sufficient solutions, embodiments of the present disclosure can combine genetic programming with more specialized deterministic symbolic regression heuristics for different application domains. Embodiments of the present disclosure can start approximations at a level of granularity determined by profiling and affinity analysis and then decompose the code if genetic programming and other heuristics are unable to find an acceptable solution. This approach can be complemented through prediction methods that provide statistical analysis of situations in which genetic programming is unlikely to find a more suitable solution.

Embodiments of the present disclosure can minimize genetic programming and symbolic regression execution time by specifying a specific time period, upon which, the approximation discovery will cease and return all solutions derived to that point. In further embodiments, approximations can be derived through genetic programming and symbolic regression heuristics online (e.g., cloud-based approximation server) and these approximations can be dynamically updated on the application as new approximations are discovered. This approach can be complemented by caching techniques that focus exploration on regions affected by code modifications.

Embodiments of the present disclosure configure the genetic programming and symbolic regression heuristics to support arbitrary code. Genetic programming can be sensitive to configuration parameters such as functions, terminals, techniques for crossover and mutation, etc. Embodiments of the present disclosure can employ meta-optimization techniques to tune optimization parameters to maximize approximation discovery. Additionally, in certain embodiments, parameters can be varied based upon application characteristics and phylogeny patterns.

In another embodiment of the present disclosure, a cloud-based service can complement existing compilers by receiving code and returning an optimized approximation that can be used directly by a user or designer having a client device, or a compiler. In yet another embodiment a cloud-based service can continuously search for and develop new approximations and from time to time automatically return these approximations to a user or developer having a client device, or a compiler. Additionally in certain embodiments of the present disclosure, users or developers can manually, using a computing device (e.g., client device) contribute approximations to a library of a cloud-based service.

FIGS. 7(a)-7(c) illustrate an exemplary field-programmable gate array (FPGA) specific approximations for use with embodiments of the present disclosure. FIG. 7(a) presents a conceptual example of an FPGA convolution circuit using 32-bit floating point. Even though convolution contains parallelism, the process can be optimized through pipeline replication (i.e., loop unrolling). Traditionally, floating point average operations require a significant portion of the FPGA's resources. FIG. 7(b) presents various example approximations that reduce the area to enable four parallel pipelines, as seen in FIG. 7(c). Although this example uses simple mathematical operations, this is for demonstrative purposes only, and embodiments of the present disclosure support complex operations/functions, in addition to existing approximations. Genetic programming can decompose an existing application into regions for separate resources and create resource specific approximations within each region. In embodiments, genetic programming for FPGAs can concentrate on tree height reduction, increased replication through area reduction, synchronization relaxing, and/or FPGA-amenable approximation.

A greater understanding of the present invention and it many advantages may be had from the following examples, given by way illustration. The following examples are some of the methods, applications, embodiments and variants of the present invention. They are, of course, not to be considered as limiting the invention. Numerous changes and modifications can be made with respect to the invention.

Experimental Results

Example 1

In order to demonstrate the increased parallelism and enhanced performance, the following trial was conducted. FIGS. 6(a)-6(c) illustrate an exemplary unrolled data flow graph (DFG) to illustrate the distinction between embodiments of the present disclosure and existing techniques. Although FIGS. 6(a)-6(c) present an example of approximation on a simple DFG of an unrolled loop, the framework of the embodiments of the present disclosure can approximate any function, including those with control flow. FIG. 6(a) presents simple program code, which consists of a loop with loop-carried dependencies. Unrolling this form of loop is problematic for compilers because the unrolling creates a long sequence of dependent operations with no parallelism, as shown in FIG. 6(b). This example relies on the presumption that all operations require the same time period to complete, which makes sequential performance equal to the total number of operation (41 in this example), and parallel performance equal to the maximum path through the DFG. Although certain similar examples can be parallelized via tree-height reduction by a compiler, this technique only works with associative operations. This example uses non-associative subtractions, which prohibits traditional parallelization. Embodiments of the present disclosure provide the key advantages over traditional techniques of being able to automatically generate application specific approximations.

FIG. 6(c) presents an approximation of the original function generated by a framework according to an embodiment of the present disclosure. As seen FIG. 6(c), this more balanced tree structure exhibits increased parallelism over the original code, achieves a 5.9× speedup with a mean absolute percentage error of 5.2×10-14%, which was determined using 10,000 uniformly distributed random inputs between −32,000 and 32,000.

For this example, the error can be attributed to the non-associativity of floating point operations. Existing compilers either disregard the error introduced by the order of floating-point operations, or allow the designer to specify different optimization objectives (e.g., precision, fast, strict.) This is different than embodiments of the present disclosure, which identify Pareto-optimal trade-offs between error and performance. Genetic programming combined with deterministic symbolic regression heuristics enables embodiments of the present disclosure to automatically identify Pareto-optimal tradeoffs as part of an overall exploration of the approximation strategies.

Example 2

In order to demonstrate how different inputs respond to different approximations, the following experiment was conducted. FIGS. 8(a)-8(c) illustrate an exemplary unrolled dataflow graph (DFG).

FIG. 8(a) presents a loop with loop-carried dependencies and non-associative operations that are not parallelized by compilers. 10,000 input arguments between −32,000 and 32,000 were randomly selected and passed through the loop. Genetic programming identified the loop as statistically likely to converge towards an output of −1, as seen in FIG. 8(b). This process eliminated all operations of the original loop and resulted in a speedup of 21× with an error of 0.08%. The process was repeated using random selected inputs between 0 and 1. This iteration provided a different approximation, as seen in FIG. 8(c), and result in a speedup of 3.5× with an error of 1.2×10-14%. Embodiments of the present disclosure assist the developer in identifying key input ranges to optimize approximation; these ranges are identified herein as semantic-varying inputs.

A potential strategy for identifying semantic-varying inputs is to employ adversary meta-heuristic algorithms to evaluate the input space for inputs that produce error outliers compared to other inputs. This process is supplemented with use of local and global error distributions. For example, each peak in an error distribution with multiple peaks potentially corresponds to a semantic varying input range. To further assist in the determination of semantic-varying inputs, the phylogeny from genetic programming can potentially reduce the input space to regions that have the highest probability to cause errors. Another strategy for specific domains, is to use representative tests inputs (e.g., common videos for signal processing) to further reduce the input space. Additionally, in conjunction with a runtime optimizer, user feedback or developer specification (e.g., by way of a client computing device) is used to identify appropriate semantic-varying inputs.

Example 3

In order to demonstrate the parallelizing discovery capabilities of the present disclosure the following experiment was conducted. The initial step was to develop a genetic-programming framework in Python that extended the Distributed Evolutionary Algorithms in Python (DEAP). Although this experiment approximates functions written in Python, embodiments of the present disclosure can support any language by sampling a function's outputs, as shown in FIGS. 5(a)-5(c). The next step is to enter a function as an input, whereupon the genetic programming and deterministic heuristics framework assembles approximations using basic mathematical primitives (e.g., addition, multiplication, sine, and log) in addition to coarse-grained existing approximations (e.g., neural nets, perceptrons, and hidden Markov models), while utilizing standard cross-over strategies (e.g., one-point crossover, one-point leaf-biased crossover) and mutation strategies (e.g., uniform, node replacement, random sub-tree insertion, and random-subtree removal). The framework is guided by genetic programming, deterministic heuristics, and fitness functions that consider parallelism of the approximation in addition to goal-specific metrics and application constraints. Performance and energy estimations can include system or application specific characteristics (e.g., communication, bandwidth limits), which enables genetic programming and deterministic heuristics to optimize approximation to avoid inefficient data movement. In certain embodiments, the framework accomplishes this by computing a plurality of error metrics (e.g., root mean squared, mean) by executing the approximation with random inputs and comparing to the original code.

Figure 10A:
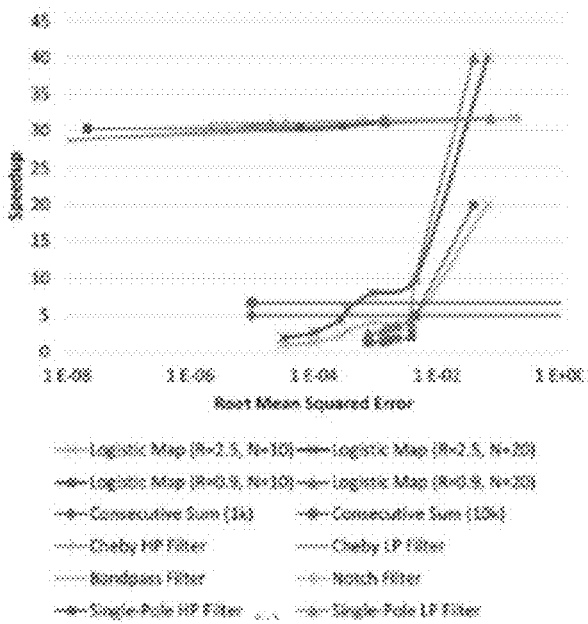
Figure 10B:
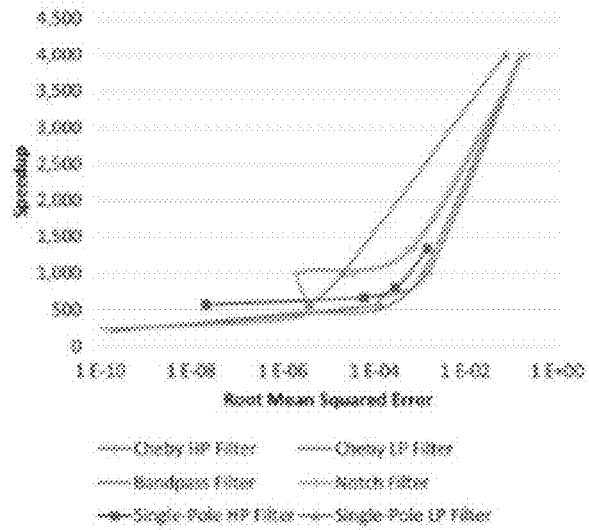

FIGS. 10(a)-10(b) illustrate speedup versus root mean squared error for an exemplary approximation analysis according to embodiments of the present disclosure.

An original code with loop-carried dependencies was replaced with approximations that have independent (i.e., parallel) iterations. This example was evaluated with recurrence relations and demonstrates that the systems and methods described herein, can automatically find closed-form solutions, or solutions with parallel iterations. For example, embodiments of the present disclosure can convert infinite impulse response (IIR) filters into finite impulse response (FIR) filters with no predefined knowledge of such concepts. In this example, each input was written with Python code, but performance was analyzed independent of language by using the pessimistic speedup obtained by the approximation compared to an optimally parallelized implementation of the original code, where the execution time is the depth of the fully unrolled DFG. Input sizes were chosen based upon reasonableness of use in real world situations. The remaining examples experience speedups from approximately 1× to approximately 40× and as the speedups increases, error increases due to the increased complexity of the discovered solutions.

FIG. 10(a) illustrates speed up when constrained to input bandwidths that match existing Peripheral Component Interconnect Express (PCIe), and FPGA/GPU accelerators. The results show that the filter examples achieve significant speedups of approximately 30× coupled with low error. The consecutive sum examples achieve flat speedups of 5× and 7× for inputs sizes of 1 k and 10 k, respectively. These speedups do not change with increased error, as seen in FIG. 10(a). This is a result of finding an exact closed form solution that is simple enough to no longer benefit from additional approximation.

The most remarkable result occurred with the logistic map example. The logistic map example is a recurrence relation with no known closed-form solution for the tested input values (R=0.9, N=10). Despite not having a known solution, the framework, described above, found an approximation with a root mean squared error of less than 1×10−4. These discovery capabilities are demonstrated by counterintuitive characteristics of the generated approximation. Although the Logistic Map uses only multiplication and subtraction, the approximation uses a square root, a cosine, and a hyperbolic tangent.

FIG. 10(b) illustrates speedups for the filter examples for cases that may not be as limited by input bandwidth (e.g., FPGA internal memory, large distributed systems with replicated data). The other examples are omitted as their speedups are unaltered by additional input bandwidths. These results demonstrate that the (1) filters exhibited higher speedups, ranging from around 200× to approximately 4000× and (2) significant increase in speedup can be gained with increased error.

Example 4

In order to demonstrate the relationship between speedups and error the following experiment was conducted. FIG. 11 illustrates speedup versus mean absolute percentage error for an exemplary approximation analysis according to embodiments of the present disclosure. FIG. 11 is a plot of the relationship between speedups and error for 336 randomly generated DFGs representing unrolled loops. The DFGs contained random types of floating-point operations (with multiple non-associative operations), a random numbers of inputs, and a random numbers of operations ranging from 20 to 160. The results demonstrated a range of speedups between 2.3× and 81× with larger speedups tending to correlate to larger error. The overall average speed up was 9.5× and the overall average error was 0.3%. 93% of the examples achieved less than 1% error and the remaining 7% had an error range between 1% and 5.9%. Applications with fewer operations are limited as by the level of speedups as fewer operations can be approximated. Real word scenarios can expect higher speedups and the number of operations tend to be high. The tests were then repeated with integer types and some of the general approximation exhibited 0% error. This demonstrates that the systems and methods described herein are not limited to approximations, but can discover new error-free transformations. The results also demonstrate a range of different approximation techniques. Genetic programming and deterministic heuristics not only increased parallelism but removed iterations of a loop that had little to insignificant effect on error. Traditionally this technique is known as loop perforation, but this framework automatically discovered the approximation. This experimented also demonstrated that although genetic programming and deterministic heuristics tend to reduce the number and parallelize operation, under the framework described here according to certain embodiments, genetic programming and deterministic heuristics increased the number of operation in order to enable parallel approximations. Additionally genetic programming and deterministic heuristics deleted some of the original inputs, which is beneficial to relieve stress on data flow traffic and improve scalability.

Example 5

In order to demonstrate the applicability of the present disclosure on an FPGA, the following experiment was conducted. FIG. 12 illustrates speedup versus mean absolute percentage error for exemplary parallel approximations using Field Programmable Gate Arrays (FPGAs) according to embodiments of the present disclosure. FIG. 12 shows a plot of speedups for parallelizing approximations, specifically for FPGAs, in which parallelism is often limited by available resources. In this experiment achievable parallelism is compared between Altera® IP cores (synthesized for Arria 10) and automatically generated approximations. By reducing the area of the cores, the approximation enables the FPGA designs to achieve significant increase in spatial parallelism. The results demonstrate speedups between 1× to 10× for errors below 5% and speedups of over 100× for larger error. The ln example achieved a speedup of 757× at 18% error. These results assume equal clock frequencies, which may make the speedups pessimistic due to most approximations using fine-grained operations.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A method for discovering and optimizing approximations, comprising:
receiving an approximation candidate data structure, the approximation candidate data structure comprising a function identifier, a plurality of samples representative of a function associated with the function identifier, a global error probability metric, and an architecture identifier, wherein each sample comprises an input value and a corresponding output value, wherein the plurality of samples representative of the function are generated based at least in part on a determination as to whether the function has a critical impact on a performance of an input application instructions set, and wherein the global error probability metric is based at least in part on a local-error probability distribution and a global-error probability distribution associated with the approximation candidate data structure;

determining, using a trained machine learning model, a plurality of approximation data structures, wherein each approximation data structure comprises an approximation function, an approximation function error, and an approximation function performance metric, wherein the plurality of approximation data structures is determined based at least in part on the plurality of samples representative of the function associated with the function identifier, the global error probability metric, and the architecture optimized fitness function, wherein the trained machine learning model comprises a symbolic regression;

assigning a rank position to each approximation data structure of the plurality of approximation data structures, wherein the rank position is determined based on an approximation affinity generated using the global error probability metric, the approximation function error, and the approximation function performance metric;

arranging the plurality of approximation data structures according to the assigned rank positions to produce a prioritized approximation data structure list; and transmitting the prioritized approximation data structure list to a requesting computing device.

2. The method for optimizing approximations of claim 1, wherein the architecture optimized fitness function comprises a consideration of one or more of approximation error, parallelism, power, and energy.

3. The method for optimizing approximations of claim 1, wherein the trained machine learning model further comprises a genetic programming algorithm.

4. The method for optimizing approximations of claim 3, further comprising composing a plurality of computational units into a pipelined tree structure.

5. The method for optimizing approximations of claim 3, wherein the trained machine learning model is trained using data samples from known inputs and corresponding outputs of mathematical and programmatic functions.

6. The method for optimizing approximations of claim 1, wherein the plurality of samples representative of the function associated with the function identifier and the global error probability metric are generated by:

receiving the input application instructions set, the input application instructions set comprising a plurality of functions, each function comprising a plurality of architecture dependent instructions;

identifying every function of the plurality of functions that constitutes a performance critical function, a performance critical function having a critical impact on a performance of the input application instructions set;

for each performance critical function:

upon determining that the performance critical function is already an approximation of a previously identified performance critical function, generating an additional approximation of the previously identified performance critical function;

passing a first range of inputs through the previously identified performance critical function to produce a first output;

passing the first range of inputs through the additional approximation to produce a second output;

generating a local-error probability distribution for the additional approximation based on the first output and the second output;

passing the first range of inputs through the input application instructions set to produce a third output;

passing the first range of inputs through a second input application instructions set comprising the first input application instructions set with the additional approximation substituted in for the performance critical function to produce a fourth output;

generating a global-error probability distribution for the additional approximation based on the third output and the fourth output; and generating a global-error probability metric for the additional approximation based on the local-error probability distribution and its global-error probability distribution;

upon determining that the performance critical function is not already an approximation of a previously identified performance critical function, generating an approximation of the performance critical function;

generating an approximation of the performance critical function;

passing a first range of inputs through the performance critical function to produce a first output;

passing the first range of inputs through the additional approximation to produce a second output;

generating a local-error probability distribution for the approximation based on the first output and the second output;

passing the first range of inputs through the input application instructions set to produce a third output;

passing the first range of inputs through a second input application instructions set comprising the first input application instructions set with the approximation substituted in for the performance critical function to produce a fourth output;

generating a global-error probability distribution for the approximation based on the third output and the fourth output; and generating a global-error probability metric for the approximation based on the local-error probability distribution and its global-error probability distribution.

7. The method for optimizing approximations of claim 6, wherein the global error probability of the approximation candidate data structure exceeds a global error probability threshold.

8. The method for optimizing approximations of claim 6, further comprising:

generating a plurality of error metrics for the approximation or additional approximation; and computing the plurality of error metrics by executing the approximation with random inputs and comparing to the original code.

9. The method for optimizing approximations of claim 8, wherein the plurality of error metrics comprises one or more of root mean squared and mean.

10. The method for optimizing approximations of claim 9, wherein the plurality of error metrics is computing by executing the approximation or additional approximation with randomly selected sets of inputs and comparing the output to that of the input application instructions set executed using the same randomly selected sets of inputs.

11. The method for optimizing approximations of claim 1, wherein determining the plurality of approximation data structures comprising identifying, based on the plurality of samples, mathematical functions equivalent to the function within an error-performance metric acceptability threshold.

12. A computing apparatus, the computing apparatus comprising:
a processor; and
a memory storing instructions that, when executed by the processor, configure the apparatus to:
receive an approximation candidate data structure, the approximation candidate data structure comprising a function identifier, a plurality of samples representative of a function associated with the function identifier, a global error probability metric, and an architecture identifier, wherein each sample comprises an input value and a corresponding output value, wherein the plurality of samples representative of the function are generated based at least in part on a determination as to whether the function has a critical impact on a performance of an input application instructions set, and wherein the global error probability metric is based at least in part on a local-error probability distribution and a global-error probability distribution associated with the approximation candidate data structure;
retrieve an architecture optimized fitness function based on the architecture identifier;
determine, using a trained machine learning model, a plurality of approximation data structures, wherein each approximation data structure comprises an approximation function, an approximation function error, and an approximation function performance metric, wherein the plurality of approximation data structures is determined based at least in part on the plurality of samples representative of the function associated with the function identifier, the global error probability metric, and the architecture optimized fitness function, wherein the trained machine learning model comprises a symbolic regression;
assign a rank position to each approximation data structure of the plurality of approximation data structures, wherein the rank position is determined based on an approximation affinity generated using the global error probability metric, the approximation function error, and the approximation function performance metric;
arrange the plurality of approximation data structures according to the assigned rank positions to produce a prioritized approximation data structure list; and
transmit the prioritized approximation data structure list to a requesting computing device.

13. The computing apparatus of claim 12, wherein the architecture optimized fitness function comprises a consideration of one or more of approximation error, parallelism, power, and energy.

14. The computing apparatus of claim 12, wherein the trained machine learning model further comprises a genetic programming algorithm.

15. The computing apparatus of claim 14, wherein the instructions further configure the apparatus to compose a plurality of computational units into a pipelined tree structure.

16. The computing apparatus of claim 14, wherein the trained machine learning model is trained use data samples from known inputs and corresponding outputs of mathematical and programmatic functions.

17. The computing apparatus of claim 12, wherein the plurality of samples representative of the function associated with the function identifier and the global error probability metric are generated by:
receive the input application instructions set, the input application instructions set comprising a plurality of functions, each function comprising a plurality of architecture dependent instructions;
identify every function of the plurality of functions that constitutes a performance critical function, a performance critical function having a critical impact on a performance of the input application instructions set;
for each performance critical function:
upon determining that the performance critical function is already an approximation of a previously identified performance critical function, generate an additional approximation of the previously identified performance critical function;
pass a first range of inputs through the previously identified performance critical function to produce a first output;
pass the first range of inputs through the additional approximation to produce a second output;
generate a local-error probability distribution for the additional approximation based on the first output and the second output;
pass the first range of inputs through the input application instructions set to produce a third output;
pass the first range of inputs through a second input application instructions set comprising the first input application instructions set with the additional approximation substituted in for the performance critical function to produce a fourth output;
generate a global-error probability distribution for the additional approximation based on the third output and the fourth output; and
generate a global-error probability metric for the additional approximation based on the local-error probability distribution and its global-error probability distribution;
upon determining that the performance critical function is not already an approximation of a previously identified performance critical function, generate an approximation of the performance critical function;
generate an approximation of the performance critical function;
pass a first range of inputs through the performance critical function to produce a first output;
pass the first range of inputs through the additional approximation to produce a second output;
generate a local-error probability distribution for the approximation based on the first output and the second output;
pass the first range of inputs through the input application instructions set to produce a third output;
pass the first range of inputs through a second input application instructions set comprising the first input application instructions set with the approximation substituted in for the performance critical function to produce a fourth output;
generate a global-error probability distribution for the approximation based on the third output and the fourth output; and generate a global-error probability metric for the approximation based on the local-error probability distribution and its global-error probability distribution.

18. The computing apparatus of claim 17, wherein the global error probability of the approximation candidate data structure exceeds a global error probability threshold.

19. The computing apparatus of claim 17, wherein the instructions further configure the apparatus to:
generate a plurality of error metrics for the approximation or additional approximation; and
compute the plurality of error metrics by executing the approximation with random inputs and comparing to the original code.

20. The computing apparatus of claim 19, wherein the plurality of error metrics comprises one or more of root mean squared and mean.

21. The computing apparatus of claim 20, wherein the plurality of error metrics is computing by executing the approximation or additional approximation with randomly selected sets of inputs and compare the output to that of the input application instructions set executed using the same randomly selected sets of inputs.

22. The computing apparatus of claim 12, wherein determining the plurality of approximation data structures comprising identify, based on the plurality of samples, mathematical functions equivalent to the function within an error-performance metric acceptability threshold.

23. A non-transitory computer-readable storage medium, the computer-readable storage medium including instructions that when executed by a computer, cause the computer to:
receive an approximation candidate data structure, the approximation candidate data structure comprising a function identifier, a plurality of samples representative of a function associated with the function identifier, a global error probability metric, and an architecture identifier, wherein each sample comprises an input value and a corresponding output value, wherein the plurality of samples representative of the function are generated based at least in part on a determination as to whether the function has a critical impact on a performance of an input application instructions set, and wherein the global error probability metric is based at least in part on a local-error probability distribution and a global-error probability distribution associated with the approximation candidate data structure;
retrieve an architecture optimized fitness function based on the architecture identifier;
determine, using a trained machine learning model, a plurality of approximation data structures, wherein each approximation data structure comprises an approximation function, an approximation function error, and an approximation function performance metric, wherein the plurality of approximation data structures is determined based at least in part on the plurality of samples representative of the function associated with the function identifier, the global error probability metric, and the architecture optimized fitness function, wherein the trained machine learning model comprises a symbolic regression;
assign a rank position to each approximation data structure of the plurality of approximation data structures, wherein the rank position is determined based on an approximation affinity generated using the global error probability metric, the approximation function error, and the approximation function performance metric;
arrange the plurality of approximation data structures according to the assigned rank positions to produce a prioritized approximation data structure list; and
transmit the prioritized approximation data structure list to a requesting computing device.

24. The computer-readable storage medium of claim 23, wherein the architecture optimized fitness function comprises a consideration of one or more of approximation error, parallelism, power, and energy.

25. The computer-readable storage medium of claim 23, wherein the trained machine learning model further comprises a genetic programming algorithm.

26. The computer-readable storage medium of claim 25, wherein the instructions further configure the computer to compose a plurality of computational units into a pipelined tree structure.

27. The computer-readable storage medium of claim 25, wherein the trained machine learning model is trained use data samples from known inputs and corresponding outputs of mathematical and programmatic functions.

28. The computer-readable storage medium of claim 23, wherein the plurality of samples representative of the function associated with the function identifier and the global error probability metric are generated by:
receive the input application instructions set, the input application instructions set comprising a plurality of functions, each function comprising a plurality of architecture dependent instructions;
identify every function of the plurality of functions that constitutes a performance critical function, a performance critical function having a critical impact on a performance of the input application instructions set;
for each performance critical function:
upon determining that the performance critical function is already an approximation of a previously identified performance critical function, generate an additional approximation of the previously identified performance critical function;
pass a first range of inputs through the previously identified performance critical function to produce a first output;
pass the first range of inputs through the additional approximation to produce a second output;
generate a local-error probability distribution for the additional approximation based on the first output and the second output;
pass the first range of inputs through the input application instructions set to produce a third output;
pass the first range of inputs through a second input application instructions set comprising the first input application instructions set with the additional approximation substituted in for the performance critical function to produce a fourth output;
generate a global-error probability distribution for the additional approximation based on the third output and the fourth output; and
generate a global-error probability metric for the additional approximation based on the local-error probability distribution and its global-error probability distribution;
upon determining that the performance critical function is not already an approximation of a previously identified performance critical function, generate an approximation of the performance critical function;
generate an approximation of the performance critical function;

pass a first range of inputs through the performance critical function to produce a first output;

pass the first range of inputs through the additional approximation to produce a second output;

generate a local-error probability distribution for the approximation based on the first output and the second output;

pass the first range of inputs through the input application instructions set to produce a third output;

pass the first range of inputs through a second input application instructions set comprising the first input application instructions set with the approximation substituted in for the performance critical function to produce a fourth output;

generate a global-error probability distribution for the approximation based on the third output and the fourth output; and generate a global-error probability metric for the approximation based on the local-error probability distribution and its global-error probability distribution.

29. The computer-readable storage medium of claim 28, wherein the global error probability of the approximation candidate data structure exceeds a global error probability threshold.

30. The computer-readable storage medium of claim 28, wherein the instructions further configure the computer to:
generate a plurality of error metrics for the approximation or additional approximation; and
compute the plurality of error metrics by executing the approximation with random inputs and comparing to the original code.

31. The computer-readable storage medium of claim 30, wherein the plurality of error metrics comprises one or more of root mean squared and mean.

32. The computer-readable storage medium of claim 31, wherein the plurality of error metrics is computing by executing the approximation or additional approximation with randomly selected sets of inputs and compare the output to that of the input application instructions set executed using the same randomly selected sets of inputs.

33. The computer-readable storage medium of claim 23, wherein determining the plurality of approximation data structures comprising identify, based on the plurality of samples, mathematical functions equivalent to the function within an error-performance metric acceptability threshold.

34. The computer-readable storage medium of claim 23, wherein an FPGA is utilized for increased speed of performing the symbolic regression.

* * * * *